US008351309B2

(12) United States Patent
Kanbe et al.

(10) Patent No.: US 8,351,309 B2
(45) Date of Patent: Jan. 8, 2013

(54) THERMALLY ASSISTED MAGNETIC RECORDING MEDIUM AND MAGNETIC RECORDING STORAGE

(75) Inventors: Tetsuya Kanbe, Ichihara (JP); Atsushi Hashimoto, Ichihara (JP); Takayuki Fukushima, Ichihara (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 13/033,010

(22) Filed: Feb. 23, 2011

(65) Prior Publication Data
US 2011/0205862 A1 Aug. 25, 2011

(30) Foreign Application Priority Data
Feb. 23, 2010 (JP) .................................. 2010-037509

(51) Int. Cl.
G11B 7/085 (2006.01)

(52) U.S. Cl. ..................................................... 369/30.03

(58) Field of Classification Search .................. None
See application file for complete search history.

(56) References Cited

U.S. PATENT DOCUMENTS

| 7,862,914 | B2 * | 1/2011 | Kubota et al. ................. 428/831 |
| 2002/0068199 | A1 * | 6/2002 | Futamoto et al. ....... 428/694 TS |
| 2003/0215675 | A1 * | 11/2003 | Inaba et al. ............ 428/694 TP |
| 2004/0161638 | A1 * | 8/2004 | Maeda et al. .............. 428/694 T |
| 2004/0191578 | A1 * | 9/2004 | Chen et al. .............. 428/694 TS |
| 2006/0280973 | A1 * | 12/2006 | Sun et al. .................... 428/831.2 |
| 2007/0160824 | A1 * | 7/2007 | Ichihara et al. ............. 428/304.4 |
| 2009/0136782 | A1 * | 5/2009 | Lu .................................. 428/828 |
| 2010/0055503 | A1 * | 3/2010 | Shimatsu et al. .......... 428/836.1 |
| 2010/0118600 | A1 * | 5/2010 | Nagase et al. ................. 365/158 |
| 2010/0165508 | A1 * | 7/2010 | Girt et al. ...................... 360/135 |
| 2011/0235479 | A1 * | 9/2011 | Kanbe et al. .............. 369/13.32 |

OTHER PUBLICATIONS

En Yang, et al., "L1$_0$ FePt-oxide columnar perpendicular media with high coercivity and small grain size", Journal of Applied Physics, 2008, pp. 023904-1-023904-3, vol. 104.
J.S. Chen, et al., "Development of L1$_0$ FePt:C (001) Thin Films With High Coercivity and Small Grain Size for Ultra-High-Density Magnetic Recording Media", IEEE Transactions on Magnetics, Feb. 2009, pp. 839-844, vol. 45, No. 2.

* cited by examiner

Primary Examiner — Joseph Feild
Assistant Examiner — Henok Heyi
(74) Attorney, Agent, or Firm — Sughrue Mion, PLLC

(57) ABSTRACT

Disclosed is a thermally assisted magnetic recording medium comprising a substrate, a plurality of underlayers formed on the substrate, and a magnetic layer which is formed on the underlayers and predominantly comprised of an alloy having a L1$_0$ structure, characterized in that at least one of the underlayers is predominantly comprised of MgO and comprises at least one kind of a metal element having a melting point of at least 2,000° C., such as Nb, Mo, Ru, Ta or W. The thermally assisted magnetic recording medium has magnetic crystal grains having uniform size in the magnetic layer, and has a narrow switching field distribution (SFD), and a magnetic recording storage provided with the thermally assisted magnetic recording medium exhibits a high SN ratio.

8 Claims, 2 Drawing Sheets

THERMALLY ASSISTED MAGNETIC RECORDING MEDIUM AND MAGNETIC RECORDING STORAGE

TECHNICAL FIELD

This invention is concerned with a thermally assisted magnetic recording medium, and a magnetic recording storage provided with the thermally assisted magnesium recording storage.

BACKGROUND OF THE INVENTION

In thermally assisted magnetic recording wherein a magnetic recording medium is irradiated with an evanescent light whereby the surface of the medium is locally heated and the coercive force of the medium is decreased, and writing is effected. This thermally assisted magnetic recording attracts attention as a magnetic recording system of the next generation which is capable of realizing a high plane recording density of approximately 1 T bit/inch$^2$ or larger. In the case when the thermally assisted magnetic recording system is adopted, even when a recording medium having a coercive force of several tens kOe at room temperature is used, writing can easily be effected with a magnetic head having the currently available magnetic recording field.

Therefore a magnetic material exhibiting a high magneto crystalline anisotropy Ku of higher than $10^6$ J/m$^3$ can be adopted for the recording layer. Thus, average particle diameter of magnetic crystal grains can be reduced to 6 nm or smaller while a high thermal stability is maintained. As such high Ku material, there can be mentioned, for example, a FePt alloy with an $L1_0$ type crystalline structure having a Ku of $7 \times 10^6$ J/m$^3$ and a CoPt alloy having a Ku of $5 \times 10^6$ J/m$^3$.

In the case when a FePt alloy with an $L1_0$ type crystalline structure is used for the magnetic layer, the FePt alloy crystal grains must be (001)-ordered. It is preferable that this magnetic FePt alloy layer with an $L1_0$ type crystalline structure is formed on a (100)-ordered MgO-containing underlayer. The (100) plane of MgO exhibits good lattice constant conformity with the (001) plane of $L1_0$ type FePt alloy. Therefore, when the magnetic FePt alloy layer with an $L1_0$ type crystalline structure is formed on the (100)-ordered MgO-containing underlayer, the resulting magnetic layer exhibits (001) orientation.

To decrease a media noise and enhance an SR ratio of the magnetic recording medium, the particle diameters of magnetic crystal grains must be rendered fine even in the thermally assisted magnetic recording medium. For this purpose of rendering fine the magnetic crystal grains, it is effective to incorporate an oxide such as $SiO_2$ or $TiO_2$ as a grain boundary segregation material in the magnetic layer. That is, FePt crystal grains can be of a granular structure such that the crystal grains are surrounded by the added oxide such as $SiO_2$.

The particle diameters of magnetic crystal grains can be rendered fine by adding an increased amount of the grain boundary segregation material. For example, it is described in J. Appl. Phys. 104, 023904, 2008 that the particle diameters of FePt alloy magnetic crystal grains can be reduced to 5 nm by the addition of 20 volume % of $TiO_2$. Further, it is described in IEEE. Trans. Magn., vol. 45, 839, 2008 that the particle diameters of FePt alloy magnetic crystal grains can be reduced to 2.9 nm by the addition of 50 volume % of $SiO_2$.

The magnetic layer of a thermally assisted magnetic recording medium is preferably formed from, for example, a FePt alloy with an $L1_0$ structure having a high Ku. To reduce the media noise of the thermally assisted magnetic recording medium, crystal grains of the FePt alloy must be rendered fine. Therefore, a grain boundary segregation material such as an oxide including $SiO_2$ or $TiO_2$, or carbon is preferably added into the magnetic layer. It is to be noted that the addition of a grain boundary segregation material is effective for rendering the crystal grains fine, but, the dispersion of particle diameters is generally difficult to narrow.

As mentioned above, the magnetic layer comprised of a FePt alloy with an $L1_0$ structure is preferably formed on a MgO-containing underlayer. In the case when the crystal grains in the MgO-containing underlayer have a large particle size, plural crystal grains of FePt alloy grow on one particle of the MgO crystal, and thus, the particle diameters of the grown FePt alloy crystal grains are not uniform and the dispersion of particle diameters is large. To reduce the media noise, it is essential to render uniform the particle diameters of magnetic crystal grains, and therefore, it becomes essential to render fine the particle diameters of the MgO-containing underlayer, as well as rendering fine the particle diameters of magnetic crystal grains.

BRIEF SUMMARY OF THE INVENTION

In view of the foregoing background art, a primary object of the present invention is to provide a thermally assisted magnetic recording medium characterized as having the magnetic layer comprised of magnetic crystal grains with uniform diameters, and exhibiting a narrow switching field distribution (SFD).

Another object of the present invention is to provide a magnetic recording storage which is provided with a thermally assisted magnetic recording medium having the above-mentioned benefits, and exhibits a high SN ratio.

In accordance with the present invention, there are provided the following thermally assisted magnetic recording mediums.

(1) A thermally assisted magnetic recording medium comprising a substrate, a plurality of underlayers formed on the substrate, and a magnetic layer which is formed on the underlayers and predominantly comprised of an alloy having a $L1_0$ structure, characterized in that at least one of said underlayers is predominantly comprised of MgO and comprises at least one kind of a metal element having a melting point of at least 2,000° C.

(2) The thermally assisted magnetic recording medium as mentioned above in (1), wherein the metal element having a melting point of at least 2,000° C. is at least one selected from the group consisting of Nb, Mo, Ru, Ta and W.

(3) The thermally assisted magnetic recording medium as mentioned above in (1), wherein the content of the metal element having a melting point of at least 2,000° C. in the underlayer predominantly comprised of MgO is in the range of 2 atomic % to 40 atomic %, based on the underlayer predominantly comprised of MgO.

(4) The thermally assisted magnetic recording medium as mentioned above in (1), wherein the underlayer predominantly comprised of MgO is formed on an underlayer which is comprised of Cr, or a Cr alloy predominantly comprised of Cr and having a BCC structure.

(5) The thermally assisted magnetic recording medium as mentioned above in (1), wherein the underlayer predominantly comprised of MgO is formed on an underlayer which is comprised of Ta.

(6) The thermally assisted magnetic recording medium as mentioned above in (1), wherein the underlayer predominantly comprised of MgO has an average particle diameter of not larger than 10 nm.

(7) The thermally assisted magnetic recording medium as mentioned above in (1), wherein the magnetic layer is predominantly comprised of an alloy having a $L1_0$ structure, and comprises at least one oxide or element, selected from the group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO and carbon.

(8) The thermally assisted magnetic recording medium as mentioned above in (7), wherein the content of said oxide in the magnetic layer is in the range of 10% by mole to 40% by mole, based on the magnetic layer.

(9) The thermally assisted magnetic recording medium as mentioned above in (7), wherein the content of carbon in the magnetic layer is in the range of 10 atomic % to 70 atomic %, based on the magnetic layer.

In accordance with the present invention, there is further provided the following magnetic recording storage.

(10) An improved magnetic recording storage comprising, in combination:

a magnetic recording medium;

a driving part for rotating the magnetic recording medium;

a magnetic head comprising a recording head part and a reproducing head part; said recording head part having a laser emitting means for heating the magnetic recording medium, a waveguide for guiding laser from the laser-emitting means to a tip of the recording head part, and an evanescent light-emitting means provided at the tip of the recording head part;

means for moving the magnetic head to the magnetic recording medium; and a recording-and-reproducing signal treating means for inputting signal to the magnetic head and for reproducing output signal from the magnetic head;

wherein the improvement lies in that the magnetic recording medium is a thermally assisted magnetic recording medium as mentioned above in (1).

DETAILED DESCRIPTION OF THE INVENTION

Figure 1:
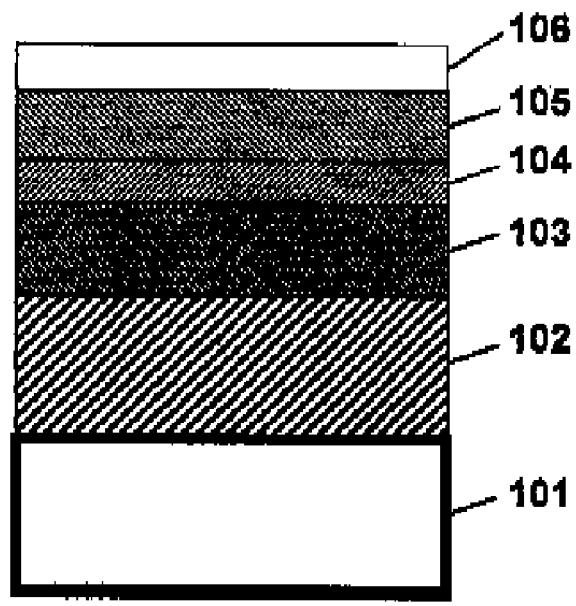
FIG. 1 is an enlarged sectional view illustrating an example of the multilayer structure of the thermally assisted magnetic recording medium of the invention.

The thermally assisted magnetic recording medium according to the present invention comprises a substrate, a plurality of underlayers formed on the substrate, and a magnetic layer which is formed on the underlayers and predominantly comprised of an alloy having a $L1_0$ structure, and is characterized in that at least one of said underlayers is predominantly comprised of MgO and comprises at least one kind of a metal element having a melting point of at least 2,000° C.

By incorporating a metal element having a melting point of at least 2,000° C. in the underlayer predominantly comprised of MgO (which underlayer is hereinafter referred to as "MgO-containing underlayer" when appropriate), the particle diameters of the MgO-containing underlayer can be rendered fine, and consequently, "one-by-one growth" of the magnetic crystal grains, i.e., growth of one particle of the magnetic crystal grains on one MgO crystal particle, can be promoted. This one-by-one growth renders uniform the particle diameters of magnetic crystal grains, which results in the reduction of the switching field distribution (SFD), whereby the SNR of the recording can be enhanced.

The metal element having a melting point of at least 2,000° C. is preferably at least one element selected from the group consisting of Nb, Mo, Ru, Ta and W. The content of the metal element having a melting point of at least 2,000° C. in the MgO-containing underlayer is preferably in the range of 2 atomic % to 40 atomic %, based on the MgO-containing underlayer. When the content of the metal element is smaller than 2 atomic %, the particle diameters of magnetic crystal grains cannot be rendered fine to the desired extent. In contrast, when the content of the metal element is larger than 40 atomic %, the NaCl structure in the MgO-containing underlayer tends to be deteriorated. The content of the metal element is more preferably in the range of 5 atomic % to 25 atomic %, based on the MgO-containing underlayer.

The particles in the MgO-containing underlayer preferably have an average particle diameter of not larger than approximately 10 nm. When the particles in the MgO-containing underlayer have such a small particle diameter, discretion of the magnetic crystal grains can be advantageously promoted. However, to realize a plane recording density of approximately 1 Tbit/inch$^2$ or more, the average particle diameter of the magnetic crystal grains should be approximately 6 nm or smaller. For these small particle diameters of the magnetic crystal grains, the average particle diameter in the MgO-containing underlayer should also be approximately 6 nm or smaller.

The magnetic layer is preferably comprised of an alloy such as FePt alloy or CoPt alloy, which has an $L1_0$ structure.

As specific examples of the grain boundary segregation material to be incorporated in the magnetic layer, there can be mentioned at least one oxide or element, selected from the group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO and carbon. These oxides and carbon may be used either alone or in combination.

The amount of the grain boundary segregation material to be incorporated in the magnetic layer is preferably at least 30% by volume based on the total volume of the magnetic layer. To discrete magnetic crystal grains to more desired extent, the grain boundary segregation material is used at least 40% by volume. However, if the amount of the grain boundary segregation material is too much, the $L1_0$ structure tends to be deteriorated, and therefore, the amount of the grain boundary segregation material is preferably not larger than 60% by volume.

The volume per mole % of the above-mentioned oxides for the grain boundary segregation material varies depending upon the particular kind of material. Therefore, the amount in mole % of the oxides used should be chosen so that the above-mentioned volume % can be obtained. For example, when $SiO_2$ is used as the grain boundary segregation material, its amount is preferably in the range of approximately 10% by mole to approximately 30% by mole based on the total magnetic layer. For the other oxides, their amounts are preferably in the range of approximately 10% by mole to approximately 40% by mole, based on the total magnetic layer.

When carbon is used as the boundary segregation material, its amount is preferably in the range of approximately 10 atomic % to approximately 70 atomic % based on the total magnetic layer.

A cap layer can be formed on the magnetic layer. By the formation of a cap layer, writing characteristics are improved. Preferably, the cap layer is predominantly comprised of at least one of Fe, Ni and Co, and contains a material having a magneto crystalline anisotropy smaller than that of a FePt alloy or a CoPt alloy.

The MgO-containing underlayer is preferably (100)-ordered so that the FePt with an $L1_0$ structure be (001)-ordered. The (100)-ordered MgO-containing underlayer can be realized, for example, by forming a Ta underlayer on a glass substrate, and then, forming a MgO layer on the Ta underlayer.

In the case when an underlayer comprised of Cr, or a Cr alloy predominantly comprised of Cr and having a BCC structure is formed on a heated glass substrate, the formed Cr or Cr alloy underlayer is (100)-ordered. A MgO-containing layer formed on the Cr or Cr alloy underlayer can also be (100)-ordered.

In addition to the above-mentioned orientation-controlling layers, a heat sink layer can be formed from an alloy material having a high thermal conductivity.

To further enhance the writing characteristics, a soft magnetic underlayer predominantly comprised of Cr or a Co can be formed.

If desired, an adhesive layer can be provided on the substrate for enhancing the adhesion to the substrate.

Figure 2:
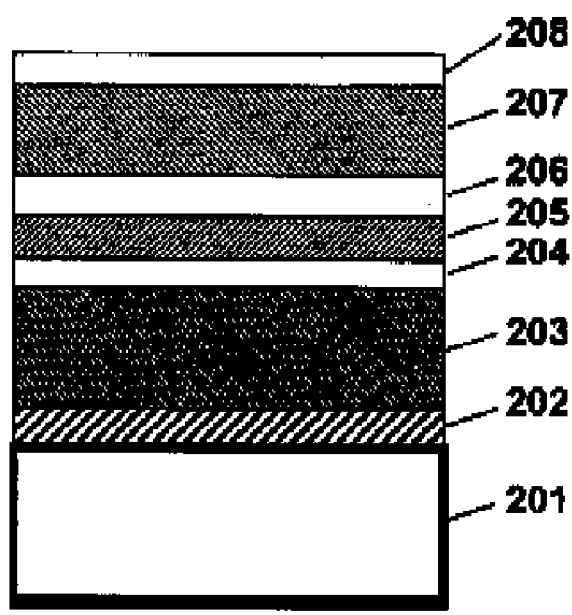
FIG. 2 is an enlarged sectional view illustrating another example of the multilayer structure of the thermally assisted magnetic recording medium of the invention.

Examples of the multilayer structure of the thermally assisted magnetic recording medium of the present invention are illustrated in FIG. 1 and FIG. 2.

In the magnetic recording medium illustrated in FIG. 1, a NiTi alloy underlayer (102), a CrMo underlayer (103), an underlayer (104) predominantly comprised of MgO, a magnetic layer (105) and a carbon protective overcoat (106) are formed in this order on a glass substrate (101).

In the magnetic recording medium illustrated in FIG. 2, a NiTa adhesive layer (202), a Ag heat sink layer (203), Ta underlayer (204), an underlayer (205) predominantly comprised of MgO, a magnetic layer (206), a cap layer (207) and a carbon protective overcoat (208) are formed in this order on a glass substrate (201).

Figure 3:
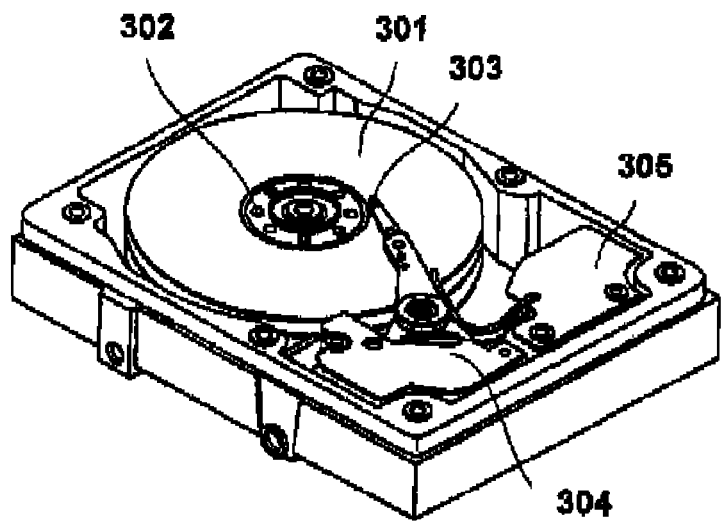
FIG. 3 is a perspective illustration showing an example of the magnetic recording storage of the invention.

An example of the magnetic recording storage of the present invention is illustrated in FIG. 3. The magnetic recording storage of the present invention comprises, in combination, a magnetic recording medium (301); a driving part (302) for rotating the magnetic recording medium; a magnetic head (303); means (304) for moving the magnetic head to the magnetic recording medium; and a recording-and-reproducing signal treating means (305) for inputting signal to the magnetic head and for reproducing output signal from the magnetic head. The structure of the magnetic head (303) is illustrated in FIG. 4, below.

The magnetic recording storage of the present invention is characterized in that the magnetic recording medium (301) is the above-mentioned thermally assisted magnetic recording medium.

Figure 4:
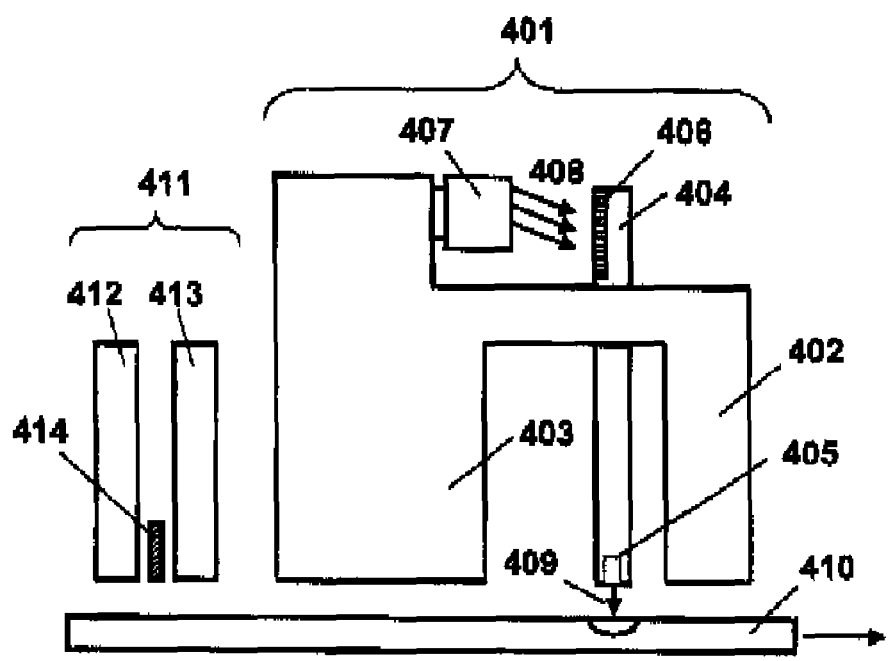
FIG. 4 is an enlarged view of a magnetic head provided in the magnetic recording storage of the invention.

FIG. 4 is an enlarged view of a magnetic head provided in the magnetic recording storage of the invention. The magnetic head comprises a recording head part (401) and a reproducing head part (411). The recording head part (401) has a laser emitting means (407) for heating the magnetic recording medium, a PSIM (planar solid immersion mirror) (404) which form a waveguide for guiding laser (408) from the laser-emitting means (407) to a tip of the recording head part (401), and an evanescent light-emitting means (405) provided at the tip of the recording head part (401).

More specifically, the recording head part (401) has an upper pole (402), a lower pole (403), and a PSIM (planar solid immersion mirror) (404) sandwiched between the upper pole (402) and the lower pole (403). The PSIM (404) can be constituted as described in, for example, Jpn., J. Appl. Phys., vol. 45, No. 2B, pp 1314-1320 (2006). The PSIM (404) has an evanescent light-emitting means (405) provided at the tip of the PSIM (404). The PSIM (404) constitute a waveguide for guiding laser from the laser-emitting means (407) to the evanescent light-emitting means (405). The PSIM has a grating part (406) which is irradiated with semi-conductor laser (408) having a wavelength of 650 nm emitted from the laser-emitting means (407). The laser is concentrated to the evanescent light-emitting means (405), and the emitted evanescent light (409) heats the thermally assisted magnetic recording medium (410).

The reproducing head part (411) of the magnetic head has a upper shield (412), a lower shield (413), and a TMR element (414) sandwiched between the upper shield (412) and the lower shield (413).

EXAMPLES

The thermally assisted magnetic recording medium and the magnetic recording storage according to the present invention will now be specifically described by the following examples.

Examples 1-1 to 1-7, and Comparative Example 1

Thermally assisted magnetic recording media having a multilayer structure as illustrated in FIG. 1 were manufactured as follows.

A Ni-50 atomic % Ti alloy underlayer (102) having a thickness of 50 nm was formed on a glass substrate (101). Then the Ni-50 at % Ti alloy underlayer-formed substrate was heated to 250° C., and a Cr-15 atomic % Mo alloy underlayer (103) having a thickness of 10 nm was formed thereon. Then an underlayer (104) predominantly comprised of MgO and having a thickness of 4 nmm was formed, and then the substrate was heated to 420° C. Thereafter, (Fe-50 atomic % Pt)-45 atomic % C magnetic layer (105) having a thickness of 6 nm and then a carbon protective overcoat (106) having a thickness of 3 nm were formed in this order.

As the underlayer (104) predominantly comprised of MgO, each of the compositions: MgO-15 atomic % Nb, MgO-12 atomic % Mo, MgO-3 atomic % Ru, MgO-5 atomic % Ta, MgO-30 atomic % W, MgO-2 atomic % Nb-2 atomic % Ru, and MgO-5 atomic % Mo-2 atomic % Ta were used, respectively, in Examples 1-1 to 1-7. For comparison, an MgO underlayer to which a metal element had not been added was used in Comparative Example 1.

Each of the magnetic recording mediums manufactured in Examples 1-1 to 1-7 and Comparative Example 1 was analyzed by X-ray diffractometry. A strong diffraction peak attributed to $L1_0$-FePt (001) in the magnetic layer was observed. Further, a mixed peak of $L1_0$-FePt (002) peak with FCC—FePt (200) peak was observed. Integral intensity ratio of the former $L1_0$-FePt (001) peak to the latter mixed peak of $L1_0$-FePt (002) and FCC—FePt (200) was in the range of 1.5 to 1.7. This shows that $L1_0$ type FePt alloy crystal having a high regularity was formed.

Average particle diameter <D> of magnetic crystal grains and standard deviation σ/<D> thereof in each of the magnetic recording mediums according to the invention and those of the comparative example were measured. The results are shown in Table 1. The average particle diameter and standard deviation thereof were measured from plane-view TEM images of the magnetic layers.

As seen from Table 1, the average particle diameter of magnetic crystal grains <D> were approximately 5 to 6 nm in the examples of the invention and the comparative example. Standard deviation σ/<D> of the magnetic recording mediums of the invention was 0.23 or smaller, but, σ/<D> of the magnetic recording medium of Comparative Example 1 was 0.32, i.e., very large. Thus, it is seen that particle diameters in the magnetic layer can be rendered uniform by incorporating in the MgO-containing underlayer at least one metal element having a melting point of at least 2000° C., such as Nb, Mo, Ru, Ta and W.

TABLE 1

| Examples | Underlayer | <D> (nm) | σ/<D> |
|---|---|---|---|
| 1-1 | MgO—15at % Nb | 5.1 | 0.17 |
| 1-2 | MgO—12at % Mo | 5.5 | 0.18 |
| 1-3 | MgO—3at % Ru | 5.2 | 0.19 |
| 1-4 | MgO—5at % Ta | 5.0 | 0.18 |
| 1-5 | MgO—30at % W | 5.8 | 0.23 |
| 1-6 | MgO—2at % Nb—2at % Ru | 5.4 | 0.21 |
| 1-7 | MgO—5at % Mo—2at % Ta | 5.7 | 0.19 |
| Comp. Ex. 1 | MgO | 5.5 | 0.32 |

Note,
<D>: Average particle diameter
σ/<D>: Standard deviation

To determine the average particle diameters in each of the underlayers predominantly comprised of MgO, samples of multilayer structures were prepared by the same procedures as mentioned above for the preparation of the magnetic recording mediums of Examples 1-1 to 1-7 and Comparative Example 1, wherein a magnetic layer was not formed after the formation of each of the MgO-containing underlayers (i.e., MgO-15 atomic % Nb, MgO-12 atomic % Mo, MgO-3 atomic % Ru, MgO-5 atomic % Ta, MgO-30 atomic % W, MgO-2 atomic % Nb-2 atomic % Ru, MgO-5 atomic % Mo-2 atomic % Ta, and MgO underlayer) was formed.

The average particle diameters in the underlayers predominantly comprised of MgO, as measured by plane TEM observation, were not larger than 10 nm. In contrast, the average particle diameter in the comparative underlayer comprised only of MgO and not containing additional metal element was larger than 30 nm. This shows that enhanced uniformity of the average particle diameters of magnetic crystal grains in the magnetic recording mediums of the present invention would be due to the fact that the particle diameters in the underlayers predominantly comprised of MgO are relatively small.

Examples 2-1 to 2-8, and Comparative Example 2

Thermally assisted magnetic recording media having a multilayer structure as illustrated in FIG. 2 were manufactured as follows.

A Ni-40 atomic % Ta alloy adhesive layer (202) having a thickness of 10 nm, a Ag heat sink layer (203) having a thickness of 100 nm, a Ta underlayer (204) having a thickness of 5 nm, and an underlayer (205) predominantly comprised of MgO and having a thickness of 5 nm were formed in this order on a glass substrate (201). Then the thus-obtained multilayer structure was heated to 380° C., and a (CO-50 atomic % Pt)-6 mol % $SiO_2$-4 mol % $TiO_2$ magnetic layer (206) having a thickness of 10 nm, a Co-6 atomic % Cr-10 atomic % B alloy cap layer (207) having a thickness of 4 nm, and then a carbon protective overcoat (208) having a thickness of 3 nm were formed in this order.

As the underlayer (205) predominantly comprised of MgO, each of the compositions: MgO-28 atomic % Nb, MgO-15 atomic % Nb-3 atomic % Mo, MgO-16 atomic % Mo, MgO-25 atomic % Ru, MgO-5 atomic % Ta-2 atomic % W, MgO-22 atomic % W, MgO-12 atomic % W-2 atomic % Mo, and MgO-5 atomic % Mo-2 atomic % Ta were used, respectively, in Examples 2-1 to 2-8. For comparison, MgO to which a metal element had not been added was used in Comparative Example 2.

Each of the magnetic recording mediums manufactured in Examples 2-1 to 2-8 and Comparative Example 2 was analyzed by X-ray diffractometry. A strong diffraction peak attributed to $L1_0$-FePt (001) in the magnetic layer was observed. Further, a mixed peak of $L1_0$-FePt (002) peak with FCC—FePt (200) peak was observed. Integral intensity ratio of the former $L1_0$-FePt (001) peak to the latter mixed peak of $L1_0$-FePt (002) with FCC—FePt (200) was in the range of 1.5 to 1.7. This shows that an $L1_0$ type FePt alloy crystal having a high regularity was formed.

The coercive force Hc and the dispersion of coercive force ΔHc/Hc of the magnetic recording mediums according to the invention and those of the comparative example were measured. The results are shown in Table 2.

Measurement of the dispersion of coercive force ΔHc/Hc was conducted by the method described in IEEE Trans. Magn., vol. 27, pp 4975-4977, 1991, at room temperature. More specifically, magnetic fields were measured when the magnetization reached 50% of the saturated value in the major loop and the minor loop. The ΔHc/Hc was calculated from the difference between the two magnetic fields on the presumption that the distribution of Hc shows Gauss distribution. The ΔHc/Hc can be an indication of switching field distribution (SFD). The smaller the ΔHc/Hc, the smaller the SFD (i.e., the better the SFD).

The Hc values of the magnetic recording mediums of the examples and the comparative example were approximately in the range of 13.5 to 15.5 kOe (note, 1 Oe equals to approximately 79 A/m). The ΔHc/Hc of the magnetic recording mediums of the examples was not larger than 0.22, but the ΔHc/Hc of the comparative example was 0.31, i.e., very large. Thus, it is seen that the ΔHc/Hc can be decreased to the desired extent by incorporating in the MgO-containing underlayer at least one metal element having a melting point of at least 2000° C., such as Nb, Mo, Ru, Ta and W.

TABLE 2

| Examples | Underlayer | Hc (kOe) | ΔHc/Hc |
|---|---|---|---|
| 2-1 | MgO—28at % Nb | 13.8 | 0.22 |
| 2-2 | MgO—15at % Nb—3at % Mo | 15.4 | 0.17 |
| 2-3 | MgO—16at % Mo | 14.2 | 0.18 |
| 2-4 | MgO—25at % Ru | 14.4 | 0.21 |
| 2-5 | MgO—5at % Ta—2at % W | 14.9 | 0.18 |
| 2-6 | MgO—22at % W | 15.2 | 0.19 |
| 2-7 | MgO—12at % W—2at % Mo | 13.6 | 0.21 |
| 2-8 | MgO—5at % Mo—2at % Ta | 14.5 | 0.19 |
| Comp. Ex. 2 | MgO | 14.1 | 0.31 |

Note,
Hc: Coercive Force
ΔHc/Hc: Dispersion of Coercive Force

Examples 3-1 to 3-6, and Comparative Examples 3-1 to 3-3

Thermally assisted magnetic recording media having the multilayer structure as illustrated in FIG. 2 were manufactured by the same procedures as mentioned in Examples 2-1 to 2-8 wherein the underlayer (205) predominantly comprised of MgO was formed from MgO having added thereto 2.5 atomic % to 38 atomic % of W in Examples 3-1 to 3-6. For comparison, comparative MgO-containing underlayers (205)

were formed from MgO only (Comparative Example 3-1), MgO-1 atomic % W (Comparative Example 3-2), or MgO-42 atomic % W (Comparative Example 3-3). All other conditions and procedures for forming the multilayer structures and compositions of the layers other than the underlayer predominantly comprised of MgO remained the same as in Examples 2-1 to 2-8.

Each of the magnetic recording mediums manufactured in Examples 3-1 to 3-6 and Comparative Examples 3-1 to 3-3 was analyzed by X-ray diffractometry. A strong diffraction peak attributed to $L1_0$-FePt(001) in the magnetic layer was observed in the magnetic recording mediums of Examples 3-1 to 3-6. Further, a mixed peak of $L1_0$-FePt(002) peak with FCC—FePt(200) peak was observed in these examples. In contrast, diffraction peak attributed to $L1_0$-FePt (001) in the magnetic layer was not observed in the magnetic recording medium of Comparative Example 3-3. It is presumed that the NaCl structure in the MgO-42 atomic % W underlayer was deteriorated and therefore epitaxial growth of FePt crystal grains was prevented.

The coercive force Hc and the dispersion of coercive force ΔHc/Hc of the magnetic recording mediums according to the invention and those of the comparative examples were measured. The results are shown in Table 3.

The ΔHc/Hc values of the magnetic recording mediums of the examples of the present invention wherein the amounts of W added in the MgO-containing underlayer were in the range of 2.5 to 38 atomic % were not larger than 0.24. In contrast, the ΔHc/Hc value of the magnetic recording medium of Comparative Example 3-1 wherein the MgO underlayer contained no additional metal element was 0.28, i.e., large. The ΔHc/Hc value of the magnetic recording medium of Comparative Example 3-2 wherein the MgO-containing underlayer contained 1 atomic % of W was 0.27, i.e., large, which was similar to that in Comparative Example 3-1 wherein the MgO underlayer contained no additional metal element. This shows that in the case when the amount of W added to the MgO-containing underlayer is only 1 atomic %, the distribution of coercive force cannot be decreased to the desired extent.

The ΔHc/Hc values of the magnetic recording medium of Comparative Example 3-3 wherein the amount of W added in the MgO-containing underlayer was 42 atomic % were 0.31, i.e., very large. It is presumed that when the amount of W added in the MgO-containing underlayer is too large, the NaCl structure in the MgO-42 atomic % W underlayer is deteriorated and therefore the orientation of FePt crystal grains in the magnetic layer is greatly disturbed.

Thus it will be seen that the amount of W added to the MgO-containing underlayer is preferably in the range of 2 atomic % to 40 atomic %. Especially when the amount of W added to the MgO-containing underlayer is 6 atomic %, 12 atomic % and 24 atomic % (in Examples 3-2 to 3-4), the ΔHc/Hc values are not larger than 1.9, i.e., very satisfactory. Therefore, when the amount of a metal element having a melting point of at least 2000° C. added to the MgO-containing underlayer is in the range of approximately 5 atomic % to approximately 25 atomic %, thermally assisted magnetic recording mediums having a very low ΔHc/Hc value (i.e., very narrow SFD) can be obtained.

TABLE 3

| Examples | Underlayer | Hc (kOe) | ΔHc/Hc |
|---|---|---|---|
| 3-1 | MgO—2.5at % W | 15.8 | 0.23 |
| 3-2 | MgO—6at % W | 15.5 | 0.19 |
| 3-3 | MgO—12at % W | 15.3 | 0.17 |
| 3-4 | MgO—24at % W | 15.0 | 0.18 |
| 3-5 | MgO—32at % W | 14.0 | 0.21 |
| 3-6 | MgO—38at % W | 14.1 | 0.24 |
| Comp. Ex. 3-1 | MgO | 16.7 | 0.28 |
| Comp. Ex. 3-2 | MgO—1at % W | 16.5 | 0.27 |
| Comp. Ex. 3-3 | MgO—42at % W | 7.5 | 0.31 |

Note,
Hc: Coercive Force
ΔHc/Hc: Dispersion of Coercive Force

Example 4

Each of the thermally assisted magnetic recording mediums manufactured in Examples 2-1 to 2-8 was coated with a perfluoropolyether lubricant. Using each lubricant-coated magnetic recording medium, a magnetic recording storage having a structure as illustrated in FIG. 3 was manufactured. The magnetic recording storage had, in combination: the thermally assisted magnetic recording medium (301); a driving part (302) for rotating the thermally assisted magnetic recording medium (301); a magnetic head (303) comprising a recording head part and a reproducing head part; means (304) for moving the magnetic head to the thermally assisted magnetic recording medium; and a recording-and-reproducing signal treating means (305) for inputting signal to the magnetic head and for reproducing output signal from the magnetic head.

The magnetic head (FIG. 3, 303) had a constitution as illustrated in FIG. 4. The magnetic head is comprised of a recording head part (401) and a reproducing head part (411).

The recording head part (401) had an upper pole (402), a lower pole (403), and a PSIM (planar solid immersion mirror) (404) sandwiched between the upper pole (402) and the lower pole (403). The PSIM (404) had an evanescent light-emitting means (405) provided at the tip of the PSIM (404). The PSIM (404) constitute a waveguide for guiding laser from the laser-emitting means (407) to the evanescent light-emitting means (405). The PSIM has a grating part (406) which is irradiated with semi-conductor laser (408) having a wavelength of 650 nm emitted from the laser-emitting means (407). The laser is concentrated to the evanescent light-emitting means (405), and the emitted evanescent light (409) heats the thermally assisted magnetic recording medium (410).

The reproducing head part (411) of the magnetic head has a upper shield (412), a lower shield (413), and a TMR element (414) sandwiched between the upper shield (412) and the lower shield (413).

Using the above-mentioned magnetic head, each of the magnetic recording mediums manufactured in Examples 2-1 to 2-8 was heated, and recording was made at a linear recording density of 1600 kFCI (kilo Flux Changes per Inch) whereby the electromagnetic conversion characteristics were evaluated. High SN ratios of at least 15 dB were obtained on all of the magnetic recording mediums of the invention. In contrast, the magnetic recording medium manufactured in Comparative Example 2 using the underlayer comprised only of MgO exhibited an SN ratio of 12.3 dB.

Thus it was seen that a thermally assisted magnetic recording medium exhibiting a high SN ratio can be obtained by using an underlayer predominantly comprised of MgO and having thereto at least one kind of metal element having a melting point of at least 2000° C. such as Nb, Mo, Ru, Ta or W.

The invention claimed is:

1. A thermally assisted magnetic recording medium comprising a substrate, a plurality of underlayers formed on the substrate, and a magnetic layer which is formed on the underlayers and predominantly comprised of an alloy having a $L1_0$ structure, characterized in that at least one of said underlayers is predominantly comprised of MgO and comprises 2 atomic % to 40 atomic % of at least one kind of a metal element having a melting point of at least 2,000° C. selected from the group consisting of Nb, Mo, Ru, Ta and W based on the underlayer predominantly comprised of MgO.

2. The thermally assisted magnetic recording medium according to claim 1, wherein the underlayer predominantly comprised of MgO is formed on an underlayer which is comprised of Cr, or a Cr alloy predominantly comprised of Cr and having a BCC structure.

3. The thermally assisted magnetic recording medium according to claim 1, wherein the underlayer predominantly comprised of MgO is formed on an underlayer which is comprised of Ta.

4. The thermally assisted magnetic recording medium according to claim 1, wherein the underlayer predominantly comprised of MgO has an average particle diameter of not larger than 10 nm.

5. The thermally assisted magnetic recording medium according to claim 1, wherein the magnetic layer is predominantly comprised of an alloy having a $L1_0$ structure, and comprises at least one oxide or element, selected from the group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO and carbon.

6. The thermally assisted magnetic recording medium according to claim 5, wherein the content of said oxide in the magnetic layer is in the range of 10% by mole to 40% by mole, based on the magnetic layer.

7. The thermally assisted magnetic recording medium according to claim 5, wherein the content of carbon in the magnetic layer is in the range of 10 atomic % to 70 atomic %, based on the magnetic layer.

8. An improved magnetic recording storage comprising, in combination:
- a magnetic recording medium;
- a driving part for rotating the magnetic recording medium;
- a magnetic head comprising a recording head part and a reproducing head part; said recording head part having a laser emitting means for heating the magnetic recording medium, a waveguide for guiding laser from the laser-emitting means to a tip of the recording head part, and an evanescent light-emitting means provided at the tip of the recording head part;
- means for moving the magnetic head to the magnetic recording medium; and
- a recording-and-reproducing signal treating means for inputting signal to the magnetic head and for reproducing output signal from the magnetic head;
- wherein the improvement lies in that the magnetic recording medium is a thermally assisted magnetic recording medium as claimed in claim 1.

* * * * *